(12) United States Patent
Suzuki et al.

(10) Patent No.: US 8,354,559 B2
(45) Date of Patent: Jan. 15, 2013

(54) PROCESS FOR PURIFYING POLYETHER

(75) Inventors: Chitoshi Suzuki, Kamisu (JP);
Tomoyuki Suzuki, Kamisu (JP);
Shigeru Ikai, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 452 days.

(21) Appl. No.: 12/396,175

(22) Filed: Mar. 2, 2009

(65) Prior Publication Data

US 2009/0203875 A1    Aug. 13, 2009

Related U.S. Application Data

(63) Continuation of application No. PCT/JP2007/066806, filed on Aug. 29, 2007.

(30) Foreign Application Priority Data

Aug. 31, 2006  (JP) ................................. 2006-236937

(51) Int. Cl.
*C07C 213/00* (2006.01)
(52) U.S. Cl. ........ 564/505; 528/425; 528/403; 556/445; 568/624; 568/625; 568/699; 568/620
(58) Field of Classification Search .................. 564/505; 528/425, 403; 556/445; 568/624, 625, 699, 568/620
See application file for complete search history.

(56) References Cited

U.S. PATENT DOCUMENTS

| | | | |
|---|---|---|---|
| 4,721,818 A | 1/1988 | Harper et al. | |
| 4,877,906 A | 10/1989 | Harper et al. | |
| 4,987,271 A | 1/1991 | Watabe et al. | |
| 5,185,093 A * | 2/1993 | Ichikawa et al. | 252/62.51 R |
| 5,405,977 A * | 4/1995 | Cuscurida et al. | 549/541 |
| 5,470,813 A | 11/1995 | Le-Khac | |
| 5,589,431 A | 12/1996 | Le-Khac | |
| 5,639,705 A | 6/1997 | Bowman et al. | |
| 5,712,216 A | 1/1998 | Le-Khac et al. | |
| 5,714,639 A | 2/1998 | Bowman et al. | |
| 5,731,407 A | 3/1998 | Le-Khac | |
| 5,811,566 A | 9/1998 | Watabe et al. | |
| 6,018,017 A | 1/2000 | Le-Khac | |
| 6,410,676 B1 * | 6/2002 | Yamasaki et al. | 528/76 |
| 6,762,325 B2 | 7/2004 | Inaoka et al. | |
| 6,930,210 B2 | 8/2005 | Mellado et al. | |
| 7,169,956 B2 | 1/2007 | Suzuki et al. | |
| 2003/0032761 A1 | 2/2003 | Hofmann et al. | |
| 2005/0267279 A1 | 12/2005 | Suzuki et al. | |

FOREIGN PATENT DOCUMENTS

| | | |
|---|---|---|
| DE | 199 19 267 A1 | 11/2000 |
| EP | 1 036 807 A1 | 9/2000 |
| EP | 1 036 807 A3 | 9/2000 |
| EP | 1 288 244 A1 | 3/2003 |
| EP | 1 338 618 A1 | 8/2003 |
| EP | 1 493 769 A1 | 1/2005 |
| JP | 01-229035 | 9/1989 |
| JP | 02-242821 | 9/1990 |
| JP | 02-289617 | 11/1990 |
| JP | 02-289618 | 11/1990 |
| JP | 03-088823 | 4/1991 |
| JP | 03-088824 | 4/1991 |
| JP | 03-115430 | 5/1991 |
| JP | 04-197406 | 7/1992 |
| JP | 04-197407 | 7/1992 |
| JP | 04-268329 | 9/1992 |
| JP | 07-196778 | 8/1995 |
| JP | 08-231707 | 9/1996 |
| JP | 09-194735 | 7/1997 |
| JP | 2000-513647 | 10/2000 |
| JP | 2002-201263 | 7/2002 |
| JP | 2002-212280 | 7/2002 |
| JP | 2003-165836 | 6/2003 |
| JP | 2003-342361 | 12/2003 |
| JP | 2003-342362 | 12/2003 |
| JP | 2004-182970 | 7/2004 |
| JP | 2005-015786 | 1/2005 |
| JP | 2005-132990 | 5/2005 |
| JP | 2006-256892 | 9/2006 |
| WO | WO 97/23544 | 7/1997 |
| WO | WO 2006/047436 A1 | 5/2006 |

OTHER PUBLICATIONS

U.S. Appl. No. 12/432,832, filed Apr. 30, 2009, Suzuki, et al.

* cited by examiner

*Primary Examiner* — Shane Fang
(74) *Attorney, Agent, or Firm* — Oblon, Spivak, McClelland, Maier & Neustadt, L.L.P.

(57) ABSTRACT

A polyether is synthesized by ring opening polymerization of an alkylene oxide with an initiator having at least one hydroxyl group, in the presence of a double metal cyanide complex catalyst, then a powder of an inorganic adsorbent containing at least 50 vol % of fine particles having a particle size of at most 26 μm and further containing at least 90 vol % of fine particles having a particle size of at most 44 μm, is added to the crude polyether, and a metal derived from the above double metal cyanide complex catalyst is adsorbed on the powder, followed by separating the powder from the crude polyether.

12 Claims, No Drawings

PROCESS FOR PURIFYING POLYETHER

CROSS-REFERENCE TO RELATED APPLICATIONS

This application is a continuation of PCT/JP07/066,806 filed Aug. 29, 2007.

TECHNICAL FIELD

The present invention relates to a process for purifying a polyether containing a double metal cyanide complex catalyst.

BACKGROUND ART

Heretofore, e.g. a polyether monool, a polyether polyol, polyester ether polyol or a polycarbonate ether polyol (hereinafter referred to generally as "a polyether") to be used as raw material for e.g. a polyurethane elastomer, an adhesive, a coating material or a sealant, was produced by (co)polymerizing a compound selected from the group consisting of an alkylene oxide such as ethylene oxide or propylene oxide, caprolactone and an acid hydride, with an initiator having an active hydrogen atom. As a typical polymerization catalyst applicable to such a polymerization reaction, a double metal cyanide complex catalyst (hereinafter referred to also as "DMC catalyst") has been known. A DMC catalyst is a catalyst containing an organic ligand and a metal salt, and a compound having an organic ligand, water and zinc chloride coordinated to zinc hexacyanocobaltate ($Zn_3[Co(CN)_6]_2$) is typical.

By employing tert-butyl alcohol as an organic ligand, it is possible to remarkably prolong the life span of a DMC catalyst, and thus, it has become possible to produce a polyether with a small amount of a catalyst to be used. However, even though the amount of a DMC catalyst contained in a polyether as a final product is such a small amount, there may still be a problem of e.g. a poor storage stability of an isocyanate group-containing prepolymer produced by reacting a polyisocyanate compound with the polyether obtained.

Heretofore, many proposals have been made with respect to the process for purifying a polyether produced by using a DMC catalyst. A purification process is broadly classified into a process of directly filtrating and separating fine particles of a catalyst residue contained in a polyether and a process of subjecting a catalyst to chemical treatment, adsorbing a decomposed product of the catalyst with an adsorbent, followed by filtration and separation. Proposed is a process of directly separating an unpurified polyether by filtration by a ceramic membrane having a pore diameter of from 5 to 100 nm or a microseparation membrane made of a polyvinyl fluoride, so that the remaining amount of a metal would be less than 1 ppm. However, in such a process for membrane separation of a catalyst as fine particles, clogging of the separation membrane tends to occur due to such particles, whereby there will be a problem that the filtration time tends to be long.

Many processes have been proposed, in which a DMC catalyst is deactivated with a basic substance and neutralized with an acid, and then a metal derived from a catalyst is separated by filtration from a polyether by using an adsorbent and a filter aid (for example, the following Patent Documents 1, 2, 3, 4, 5, 6, 7 and 8). Further, such Patent Documents also disclose use of an adsorbent and a filter aid having specific characteristics and specific particle diameters, but each case is directed to a method in which a basic substance is used for decomposing a DMC catalyst. Accordingly, a complicated purification step is required to sufficiently remove a basic substance which affects the reaction with an isocyanate or an acidic substance to be used for neutralizing the basic substance, from the polyether, and further there is a problem that a large amount of waste is produced since a large amount of an adsorbent is used.

Proposed are a process (Patent Document 9) in which, in the presence of water, a polyether containing a DMC catalyst is subjected to heat treatment to deactivate the catalyst, followed by crystallization by using a mineral acid or adsorption by an adsorbent, and then by dehydration under reduced pressure and further by separation by filtration, a process (Patent Document 10) in which, in the presence of water and zinc oxide, a polyether is subjected to heat treatment to deactivate a catalyst, the catalyst is then adsorbed by an adsorbent, and then dehydrated under reduced pressure, followed by separating the adsorbent by filtration (Patent Document 10), and a process (Patent Document 11) in which, in the presence of magnesium oxide or a combination of magnesium oxide and water, a catalyst is deactivated by heat treatment, adsorbed by an adsorbent, and then dehydrated under reduced pressure, followed by separating the adsorbent by filtration. In such processes, no basic substance is used, and therefore no acid-neutralizing step and cumbersome purification step are required. Further, as an inorganic adsorbent, synthetic aluminum silicate, synthetic magnesium silicate, activated clay, acid clay and a mixture thereof are disclosed. However, in a purification process disclosed in Patent Document 9, there will be a problem that it is impossible to obtain a sufficiently high filtration rate at the time of filtrating a highly viscous polyether containing fine particles derived from a catalyst deactivated and decomposed. Further, its Examples disclose that from 5 to 10 ppm of a metal derived from a DMC catalyst remains in a polyether after filtration, and the removal of the catalyst is not fully satisfied. Further, in Patent Documents 10 and 11, large amounts (4% to a polyether) of an inorganic deactivator and an adsorbent are required to reduce the amount of a metal remaining in a polyether to a level of from a few ppm to 1 ppm, and therefore there will be a problem that the waste amount of a cake including the adsorbent and the polyether adsorbed thereon becomes large.

Further, a method (Patent Document 12) is proposed for removal of catalyst and deodorization, from a polyether containing a DMC catalyst, by using, as an adsorbent, sepiolite which is microcrystalline magnesium silicate. Such a purification step is simple, but even when a polyether is purified by using at least 1 mass % of an adsorbent, the amount of a metal remaining in the polyether after the purification is at least 1 ppm, and therefore the purification level is not fully satisfied.

Patent Document 1: JP-A-1-229035
Patent Document 2: JP-A-2-242821
Patent Document 3: JP-A-2-289618
Patent Document 4: JP-A-3-88823
Patent Document 5: JP-A-3-115430
Patent Document 6: JP-A-4-197406
Patent Document 7: JP-A-4-197407
Patent Document 8: JP-A-4-268329
Patent Document 9: JP-A-3-88824
Patent Document 10: JP-A-2002-201263
Patent Document 11: JP-A-2002-212280
Patent Document 12: JP-A-2003-342362

DISCLOSURE OF THE INVENTION

Problems to be Solved by the Invention

A conventional method for purifying a polyether produced by using a double metal cyanide complex as a catalyst, had problems such that the amount of waste is increased by using a large amount of an adsorbent, it takes a long time to separate the adsorbent by filtration, and further it is not necessarily possible to sufficiently lower the remaining amount of a metal derived from a catalyst. Accordingly, it is an object of the present invention to provide a non-cumbersome process for purifying a polyether, whereby it is possible to lower the amount of an adsorbent to be used and the filtration time is relatively short, and further it is possible to lower the remaining amount of a metal derived from a catalyst in the polyether to be at most 3 ppm.

Means to Solve the Problems

The present invention has been made to solve the above problems.

Namely, the process for purifying a polyether of the present invention is a process for purifying a polyether obtainable by ring opening polymerization of an alkylene oxide or a cyclic compound containing an alkylene oxide with an initiator having at least one hydroxyl group, in the presence of a double metal cyanide complex catalyst, said process comprising adding, after the above ring opening polymerization, a powder of an inorganic adsorbent containing at least 50 vol % of fine particles having a particle size of at most 26 µm and further containing at least 90 vol % of fine particles having a particle size of at most 44 µm, to the above polyether to let a metal derived from the above double metal cyanide complex catalyst be adsorbed on the above powder; and further separating the above powder from the above polyether.

In the above purification process, the above inorganic adsorbent is preferably selected from the group consisting of synthetic aluminum silicate, synthetic alumina/magnesia, synthetic hydrotalcite, synthetic magnesium silicate and a combination thereof.

Further, in the above purification process, the above inorganic adsorbent is preferably a combination of synthetic aluminum silicate and synthetic alumina/magnesia.

Further, in the above purification process, the above powder of an inorganic adsorbent preferably contains at least 50 vol % of fine particles having a particle size of at most 20 µm and further contains at least 90 vol % of fine particles having a particle size of at most 44 µm.

Further, in the above purification process, it is preferred that, before, during and/or after adding the powder of an inorganic adsorbent to the polyether, water is added to the above polyether to let the above powder and the above water coexist in the above polyether, and further with or without dehydration, the above powder is separated and removed from the above polyether.

Further, in the above purification process, it is preferred that the above powder is separated from the above polyether by using a filter aid.

Further, in the above purification process, it is preferred that the powder of an inorganic adsorbent is added to the above polyether, followed by heating at a temperature of from 50 to 160° C. and stirring at a stirring power of at least 8 kW/m$^3$ to let the metal derived from a double metal cyanide complex catalyst be adsorbed on the above powder.

Further, the present invention also provides a process for producing a polyether purified, wherein the above production process comprises (1) a step of ring opening polymerization of an alkylene oxide or a cyclic compound containing an alkylene oxide with an initiator having at least one hydroxyl group, in the presence of a double metal cyanide complex catalyst containing tert-butanol as at least a part of a ligand, to synthesize a polyether, and (2) a step of purification of the above polyether by means of any one of the above processes for purifying a polyether of the present invention.

The present inventors have discovered that, by using an inorganic adsorbent containing at least 50 vol % of fine particles having a particle size of at most 26 µm and further containing at least 90 vol % of fine particles having a particle size of at most 44 µm, preferably an inorganic adsorbent containing at least 50 vol % of fine particles having a particle size of at most 20 µm and further containing at least 90 vol % of fine particles having a particle size of at most 44 µm, for removing a DMC catalyst and a metal derived from the DMC catalyst contained in a polyether, it is possible to increase the filtration rate to remove an inorganic adsorbent from the polyether, and further it is possible to achieve a high removal rate of the metal from the polyether, in a purification step for removing the DMC catalyst and the metal derived from the DMC catalyst from the polyether. Further, the present inventors have discovered that, in the step of purifying a polyether, by adding not only the above inorganic adsorbent having specific particle sizes but also water to the polyether, it is possible to substantially increase the filtration rate at the time of removing the inorganic adsorbent from the polyether. The present invention has been accomplished on the basis of these discoveries. The discoveries by the present inventors are unexpected from the technical common knowledge that in the purification of the polyether, the larger the particle size of the inorganic adsorbent used, the higher the filtration rate thereby obtainable.

Now, the process for purifying a polyether of the present invention and the process for producing a polyether purified by means of the purification process of the present invention will be described in detail.

In the present invention, the polyether indicates a polyether obtainable by ring opening polymerization of an alkylene oxide or a cyclic compound containing an alkylene oxide with an initiator having at least one hydroxyl group. The polyether of the present invention also includes e.g. a polyether monool and a polyether polyol made of repeating units of oxyalkylene bonded to an initiator, and a polyester ether monool, a polyester ether polyol, a polyether carbonate monool and a polyether carbonate polyol further containing a bond selected from the group consisting of an ester bond and a carbonate bond in a part of its chemical structure.

In the present invention, it is particularly preferred to use a polyether obtainable by ring opening polymerization of an alkylene oxide with an initiator having at least one hydroxyl group, in the presence of a double metal cyanide complex catalyst.

The alkylene oxide may be ethylene oxide, propylene oxide, 1,2-butylene oxide, 2,3-butylene oxide, epichlorohydrin, styrene oxide, cyclohexene oxide, oxetane, or a glycidyl compound such as a glycidyl ether or glycidyl acrylate. A preferred alkylene oxide may be ethylene oxide, propylene oxide or 1,2-butylene oxide.

A cyclic compound other than an alkylene oxide, which can be used together with an alkylene oxide, may be a cyclic ester as a cyclized dimer of hydroxycarboxylic acid selected from e.g. 2-hydroxyacetic acid, lactic acid, 2-hydroxy-2-ethyl butyric acid, 2-hydroxyisobutyric acid, 2-hydroxy-2-methylbutyric acid, malic acid, citric acid and gluconic acid; a lactone such as ε-caprolactone or δ-valerolactone; a cyclic carbonate such as ethylene carbonate, propylene carbonate, trimethylene carbonate or neopentyl carbonate; or a cyclic acid anhydride such as maleic anhydride, succinic anhydride or phthalic anhydride. The cyclic compound is preferably lactide, ε-caprolactone, maleic anhydride or phthalic anhydride. In the present invention, it is possible to carry out ring opening polymerization of an alkylene oxide with the above initiator, or it is possible to carry out ring opening copolymerization of an alkylene oxide with the above cyclic compound other than the alkylene oxide.

Now, the polyether to be used in the present invention, other raw materials to be used for the purification process of the present invention, and purification conditions, etc. will be described.

Double Metal Cyanide Complex Catalyst

A double metal cyanide complex catalyst (DMC catalyst) to be used as a catalyst in the present invention can be produced by a known production process, and for example, various processes as disclosed in JP-A-2003-165836, JP-A-2005-15786, JP-A-7-196778 and JP-A-2000-513647 may be mentioned. For example, it is possible to produce a DMC catalyst by e.g. (1) a process comprising coordinating an organic ligand with a reaction product obtainable by reacting a halogenated metal salt such as zinc chloride with an alkali metal cyanometalate such as potassium hexacyanocobaltate in an aqueous solution, then separating a solid component, followed by further washing the separated solid component with an aqueous organic ligand solution, or (2) a process comprising reacting a halogenated metal salt and an alkali metal cyanometalate in an aqueous organic ligand solution, separating a reaction product (solid component) thereby obtainable, and further washing the separated solid component with an aqueous organic ligand solution. It is also possible to prepare a double metal cyanide complex catalyst in a slurry form in such a manner that a reaction product obtained by reacting a halogenated metal salt and an alkali metal cyanometalate is washed with an aqueous organic ligand solution, and then separated by filtration to obtain a cake (solid component), and then the cake is redispersed in an aqueous organic ligand solution containing a polyether, followed by distilling off a volatile component. In order to produce a polyoxyalkylene polyol having a narrow molecular weight distribution, it is particularly preferred to use such a DMC catalyst in a slurry form.

As the above organic ligand, an alcohol, an ether, a ketone, an ester, an amine or an amide may, for example, be used, but a preferred organic ligand may be tert-butyl alcohol, tert-pentyl alcohol, ethylene glycol dimethyl ether, ethylene glycol mono-tert-butyl ether or a combination of tert-butyl alcohol and ethylene glycol mono-tert-butyl ether, and a particularly preferred organic ligand may be tert-butyl alcohol. Accordingly, it is preferred to use a double metal cyanide complex catalyst having tert-butyl alcohol as at least a part of the organic ligand. In the case of using such an organic ligand, a highly active double metal cyanide complex catalyst can be obtained, and it is thereby possible to produce a polyoxyalkylene polyol having a low total unsaturated degree. The polyether before purified, which is obtainable by ring opening polymerization of an alkylene oxide using a small amount of a highly active double metal cyanide complex catalyst, has a small remaining amount of the catalyst, and therefore it is possible to further reduce the amount of a metal derived from the catalyst contained in a polyether after purified.

Initiator Having at Least One Hydroxyl Group

As the initiator having at least one hydroxyl group to be used in the present invention, a polyether monool or a polyether polyol, a polyester polyol, or a polycarbonate polyol is preferred. Such a polyether monool or a polyether polyol may contain a chemical bond other than the ether bond, which is optionally selected from e.g. an ester bond and a polycarbonate bond. The average number of hydroxyl groups is preferably from 1 to 8 per molecule of the initiator, and the hydroxyl value is preferably from 10 to 600 mgKOH/g, more preferably from 14 to 400 mgKOH/g, particularly preferably from 34 to 240 mgKOH/g. The average number of hydroxyl groups in the initiator is the most important element to determine the average number of hydroxyl groups in the polyether monool or polyether polyol (generically referred to as a polyether) finally obtainable by means of the purification process of the present invention. The hydroxyl value (mgKOH/g) is a value measured in accordance with JIS-K-1557.

It is possible to produce the above initiator by means of a known polymerization method. Namely, it can be produced by subjecting an alkylene oxide to ring opening polymerization, or an alkylene oxide and the above cyclic compound other than the alkylene oxide to ring opening polymerization, in the presence of an appropriate initiator, by means of anion polymerization using a catalyst selected from the group consisting of an alkali metal compound such as NaOH, KOH or CsOH, an alkaline earth metal compound such as magnesium hydroxide or calcium hydroxide and a phosphazene compound, coordination polymerization using a catalyst selected from the group consisting of a porphyrin aluminum complex and a double metal cyanide complex, or cation polymerization using a catalyst selected from a Lewis acid compounds such as $BF_3$ etherate.

It is possible to produce the above initiator by ring opening polymerization of the above monomer such as an alkylene oxide with an optionally selected low molecular weight initiator having a molecular weight lower than the above initiator. As the low molecular weight initiator, it is preferred to use e.g. a monool such as methanol, ethanol, propanol, butanol or hexanol; water, or a polyol such as ethylene glycol, propylene glycol, diethylene glycol, dipropylene glycol, trimethylolpropane, glycerol, pentaerythritol, sorbitol or sucrose.

The initiator to be used in the present invention is particularly preferably a monool or a polyol obtainable by ring opening polymerization of propylene oxide and/or ethylene oxide with a low molecular weight initiator.

Ring Opening Polymerization of Alkylene Oxide by Double Metal Cyanide Complex Catalyst In the presence of the above-mentioned double metal cyanide complex catalyst, ring opening polymerization of an alkylene oxide with an initiator having at least one hydroxyl group can be carried out by a known method.

The amount of the DMC catalyst to be used, is such an amount that the content of a metal (such as Zn or Co) derived from the DMC catalyst remaining in a produced polyether before purified will be usually at most 50 ppm, preferably at most 30 ppm, particularly preferably at most 20 ppm. By reducing the metal derived from the DMC catalyst remaining in such a crude polyether before purified, it is possible to remarkably reduce the metal derived from the DMC catalyst remaining in a final polyether.

Process for Purifying Polyether

The process for purifying a polyether of the present invention will be described in detail, as follows.

The process for purifying a polyether of the present invention is a process in which an alkylene oxide or a cyclic compound containing the alkylene oxide is subjected to ring opening polymerization with an initiator having at least one hydroxyl group to obtain a polyether (a crude polyether), a powder of an inorganic adsorbent having a specific particle size as described below is added thereto, a DMC catalyst and a metal derived from the DMC catalyst are absorbed on the inorganic adsorbent, and further the inorganic adsorbent is separated by filtration from the polyether. By means of such a process, it is possible to obtain a purified polyether having a very small amount of a metal derived from the DMC catalyst.

Adsorbent

As the inorganic adsorbent to be used in the present invention, it is possible to use an optional one so long as it is an inorganic adsorbent capable of adsorbing the DMC catalyst and the metal derived from the DMC catalyst, and there is no restriction on characteristics of the inorganic adsorbent, such as a chemical composition, a structure, or an acidic or basic property. However, in the present invention, a fine particulate solid powder is used as the inorganic adsorbent. Specifically, the inorganic adsorbent contains at least 50 vol % of fine particles having a particle size of at most 26 μm and further contains at least 90 vol % of fine particles having a particle size of at most 44 μm, more preferably contains at least 50 vol % of fine particles having a particle size of at most 20 μm and further contains at least 90 vol % of fine particles having a particle size of at most 44 μm. In the inorganic adsorbent particles to be used in the present invention, when a total volume of particles having at most a specific particle size is 50% of the total volume of all the particles, such a specific particle size (50 vol % particle size) is at most 26 μm, preferably at most 20 μm. Further, the 50 vol % particle size of the inorganic adsorbent particles is preferably at least 1 μm, particularly preferably at least 5 μm.

The value of the particle size and the particle size distribution of the inorganic adsorbent in the present invention are values measured on the basis of a particle size distribution measurement by means of a laser diffraction/scattering method. Specifically, the particle size and the particle size distribution of the inorganic adsorbent in the present invention are values based on the particle size distribution measurement conducted by using a particle size analyzer: Microtrack FRA-9220, manufactured by Nikkiso Co., Ltd. Such a measurement of the particle size of the inorganic adsorbent is based on that the suspension obtained by dispersing a sample for measuring the particle size distribution in a methanol is circulated in an apparatus, then the suspension is irradiated with laser light, and the intensity distribution of scattered light (diffraction light) thus obtainable is detected.

Further, the measurement range is from 0.12 to 704 μm. The particle size and the particle size distribution of the inorganic adsorbent are measured by means of such a method, whereby it is possible to calculate the proportion (vol %) of each of fine particles having a particle sizes of at most 20 μm, at most 26 μm and at most 44 μm in the inorganic adsorbent to be used. Such a calculation can readily be made from the particle volume obtainable from a particle size of the particle and the measurement result of the particle size distribution of the particle on the assumption that the particle of the inorganic adsorbent is spherical.

By using an inorganic adsorbent having a particle size as mentioned above, the filtration rate to separate the inorganic adsorbent from a polyether is increased, whereby it is possible to obtain a polyether having a small content of a DMC catalyst and a metal derived from the DMC catalyst.

As the inorganic adsorbent, an oxide and/or hydroxide of a metal of Group 2, 13 or 14 of the Periodic Table may be mentioned as a main component thereof, and magnesium oxide, magnesium silicate, aluminum oxide, aluminum silicate, hydrotalcite, activated clay or acidic clay may be exemplified. A preferred adsorbent may be synthetic hydrotalcite, synthetic magnesium silicate, synthetic aluminum silicate or synthetic alumina/magnesia (solid solution of MgO and $Al_2O_3$) having magnesium, aluminum or/and silicon as main constituents. The inorganic adsorbent is more preferably a combination of synthetic aluminum silicate and synthetic alumina/magnesia or a combination of synthetic magnesium silicate and synthetic alumina/magnesia, particularly preferably a combination of synthetic aluminum silicate and synthetic alumina/magnesia. The mixture ratio of synthetic aluminum silicate or synthetic magnesium silicate to synthetic alumina/magnesia is preferably from 1/20 to 5/1, particularly preferably from 1/10 to 1/1 in a mass ratio.

Such an inorganic adsorbent is a particulate and non-crystalline solid powder having a high surface area, and can be produced as a powder having a particle size as mentioned above, depending upon a preparation method. As a specific example, KW700PH, KW700PL or KW700PEL as synthetic aluminum silicate, KW500PL or KW1100 as synthetic hydrotalcite, KW-600, KW-600S or KW630PH as synthetic magnesium silicate, or KW2100 as synthetic alumina/magnesia, manufactured by Kyowa Chemical Industry Co., Ltd. may be mentioned. Among them, KW700PEL, KW500PL or KW2100 is preferred, KW700PEL or KW2100 is more preferred, and a combination of KW700PEL and KW2100 is particularly preferred as the inorganic adsorbent to be used in the present invention.

Amount of Inorganic Adsorbent to be Used, and Usage

The amount of the inorganic adsorbent to be used for the process for purifying a polyether of the present invention is not particularly limited so long as it is an amount whereby it is possible to achieve the desired level of purification of the polyether. However, usually, if the viscosity of the crude polyether to be purified is high, that is, if the molecular weight is high, it is difficult to achieve a sufficient contact between the crude polyether and the added inorganic adsorbent in a short time. Accordingly, even in the case of using the powder of an inorganic adsorbent having a specific particle size as mentioned above, in order to reduce the residual amount of a metal derived from the DMC catalyst remaining in a polyether after purified, the amount of the inorganic adsorbent to be used is preferably increased. Further, also in a case where the content of the total metal derived from the DMC catalyst contained in the crude polyether is high, in order to let such a metal be adsorbed, the amount of the inorganic adsorbent to be used is preferably increased as the case requires.

In the purification process of the present invention, the content of the total metal derived from the DMC catalyst contained in the polyether purified is preferably at most 3 ppm in total. The preferred amount of the inorganic adsorbent to be used for it, is as follows. Here, "hydroxyl equivalent" means a molecular weight as calculated by hydroxyl value per hydroxyl group of a polyether, obtained from a hydroxyl value.

(1) In a case where the content of the total metal derived from the DMC catalyst in the crude polyether is from 20 to 50 ppm in total, (1a) when the hydroxyl equivalent of the crude polyether is less than 1,100, the amount of the inorganic adsorbent is preferably from 0.10 to 0.70 mass % to the crude polyether, (1b) when the hydroxyl equivalent of the crude polyether is from 1,100 to 3,500, the amount of the inorganic adsorbent is preferably from 0.40 to 1.3 mass % to the crude polyether, and (1c) when the hydroxyl equivalent of the crude polyether exceeds 3,500, the amount of the inorganic adsorbent is preferably from 1.0 to 3.0 mass % to the crude polyether.

(2) In a case where the content of the total metal derived from the DMC catalyst in the crude polyether is less than 20 ppm in total, (2a) when the hydroxyl equivalent of the crude polyether is less than 1,100, the amount of the inorganic adsorbent is preferably from 0.08 to 0.60 mass % to the crude polyether, (2b) when the hydroxyl equivalent of the crude polyether is from 1,100 to 3,500, the amount of the inorganic adsorbent is preferably from 0.30 to 1.2 mass % to the crude polyether, and (2c) when the hydroxyl equivalent of the crude polyether exceeds 3,500, the amount of the inorganic adsorbent is preferably from 0.40 to 2.0 mass % to the crude polyether.

In the present invention, it is particularly preferred that the content of the total metal derived from the double metal cyanide complex catalyst contained in the purified polyether is at most 1 ppm in total, and the amount of the inorganic adsorbent to be added for that purpose is as follows.

(3) In a case where the content of the total metal derived from the DMC catalyst in the crude polyether is from 20 to 50 ppm in total, (3a) when the hydroxyl equivalent of the crude polyether is less than 1,100, the amount of the inorganic adsorbent is preferably from 0.30 to 0.80 mass % to the crude polyether, (3b) when the hydroxyl equivalent of the crude polyether is from 1,100 to 3,500, the amount of the inorganic adsorbent is preferably from 0.45 to 1.4 mass % to the crude polyether, and (3c) when the hydroxyl equivalent of the crude polyether exceeds 3,500, the amount of the inorganic adsorbent is preferably from 2.0 to 3.5 mass % to the crude polyether.

(4) In a case where the content of the total metal derived from the DMC catalyst in the crude polyether is less than 20 ppm in total, (4a) when the hydroxyl equivalent of the crude polyether is less than 1,100, the amount of the inorganic adsorbent is preferably from 0.15 to 0.70 mass % to the crude polyether, (4b) when the hydroxyl equivalent of the crude polyether is from 1,100 to 3,500, the amount of the inorganic adsorbent is preferably from 0.40 to 1.3 mass % to the crude polyether, and (4c) when the hydroxyl equivalent of the crude polyether exceeds 3,500, the amount of the inorganic adsorbent is preferably from 0.60 to 2.5 mass % to the crude polyether.

The larger the amount of the inorganic adsorbent to be used is, the larger the amount of the polyether to be adsorbed on the inorganic adsorbent becomes, and therefore the production quantity of the polyether purified is reduced and further the amount of the cake of the inorganic adsorbent as a waste also becomes large. Accordingly, the lower the amount of the inorganic adsorbent to be used, the better. With regard to the above-mentioned amount of the adsorbent to be used, in a case where the content of the total metal derived from the DMC catalyst contained in the crude polyether is at most 50 ppm, such an amount is preferred so that the content of the total metal derived from the DMC catalyst remaining in the purified polyether becomes preferably at most 3 ppm, more preferably at most 1 ppm in total.

In the purification process of the present invention, the inorganic adsorbent may be added all at once or may be added dividedly in a plurality of times to the crude polyether. The inorganic adsorbent may be used alone, or two or more of them may be used in combination. In order to increase the speed to let the DMC catalyst and the metal derived from the DMC catalyst be adsorbed on the inorganic adsorbent, the mixture of the crude polyether and the inorganic adsorbent is preferably heated and stirred. The conditions of e.g. heating and stirring will be described later.

In the purification process of the present invention, in order to increase the filtration rate, a filter aid selected from perlite and diatomaceous earth may preferably be used in combination. The filter aid may be used in a state where the filter aid is preliminarily applied on a filter, or before carrying out the filtration, the filter aid may be added to a polyether containing the inorganic adsorbent and circulated in a filtration apparatus to carry out preliminary coating of the filter. The filter aid is used in an amount of usually from 0.1 to 2.0 mass % based on the mass of the polyether.

Addition of Water

In the purification process of the present invention, by further letting water exist in the polyether having the inorganic adsorbent added thereto, it is possible to drastically increase the filtration rate of the polyether containing the inorganic adsorbent. Accordingly, in the process for purifying a polyether of the present invention, in order to shorten the filtration time, by further letting water coexist with a mixture containing the crude polyether and the inorganic adsorbent, the metal derived from the DMC catalyst is adsorbed by the inorganic adsorbent in the presence of water, such being particularly preferred. The amount of water to be added is from 0.1 to 10 mass %, preferably from 0.1 to 6 mass %, furthermore preferably from 0.1 to 5 mass %, particularly preferably from 0.5 to 4 mass %, most preferably from 1 to 3 mass % to the crude polyether. When the amount of water to be added is larger than 0.1 mass % of the crude polyether, it is possible to shorten the filtration time at the time of separating the inorganic adsorbent by filtrating the crude polyether to obtain a purified polyether. Usually, the more the amount of water to be added is increased as compared with the polyether, the more the filtration time can be shortened. On the other hand, in a case where water is added to the crude polyether, as mentioned below, it is preferred to remove water by a method such as dehydration under reduced pressure before the inorganic adsorbent is removed by filtration from a polyether. When the amount of water to be added is at most 10 mass %, it is possible to shorten the time required for the dehydration step and save the energy.

Further, when water coexists for at least 10 minutes under good stirring conditions at the time of contacting the crude polyether with the inorganic adsorbent, it is possible to increase the filtration rate at the time of removing the inorganic adsorbent by filtration from the polyether. Accordingly, it is preferred that the time for letting the crude polyether, the inorganic adsorbent and water coexist is prolonged to some extent. As long as the time for contacting water with a mixture of the crude polyether and the inorganic adsorbent is at least 10 minutes, the timing to add water thereto is not particularly limited, but in order to further increase the filtration rate and further lower the amount of a metal derived from the DMC catalyst remaining in the polyether obtainable, it is preferred that water is also added at the time of adding the inorganic adsorbent to the crude polyether.

Heating and Stirring Conditions of Crude Polyether and Inorganic Adsorbent

In the process for purifying a polyether of the present invention, the inorganic adsorbent is added to the crude polyether, and then good stirring is sufficiently carried out to contact both of them. For that purpose, it is particularly preferred that the mixture of the crude polyether and the inorganic adsorbent is stirred under a heating condition.

The heating condition and the stirring condition are preferably selected so that it is possible to sufficiently blend the crude polyether with the inorganic adsorbent, and sufficiently contact the inorganic adsorbent with the DMC catalyst and a metal derived from the DMC catalyst in the crude polyether. As mentioned above, also in a case where water is further coexistent with a mixture of the crude polyether and the inorganic adsorbent, the mixing is preferably carried out under the conditions for sufficiently contacting the DMC catalyst, the metal derived from the DMC catalyst, water and the inorganic adsorbent one another, and the mixture is particularly preferably heated and stirred. Particularly, in a case where the molecular weight of the crude polyether is large (the hydroxyl equivalent is at least 3,500), if the stirring power for stirring the mixture of the crude polyether, the inorganic adsorbent, and water in some cases, is low, the amount of the metal derived from the DMC catalyst remaining in the polyether after purified is likely to be increased. Accordingly, in order to stir the above mixture in a sufficiently preferred mixed state, it is preferred that the mixture is stirred by using large-scaled stirring vanes having a shape suitable for stirring and mixing of a highly viscous liquid. The mixture is preferably stirred by using a stirring power of at least 4 kW/m$^3$, preferably at least 8 kW/m$^3$, more preferably at least 12 kW/m$^3$.

Here, "stirring power" is a value calculated as a known stirring power requirement, and such a value is a power requirement per unit amount of a liquid of the content, calculated from e.g. the volume and the viscosity of the content in the purification container, the shape of the container, and the shape and the number of revolutions of the stirring vanes. A preferred stirring power in the purification process of the present invention is a value to the mixture in the purification container. As a preferred example of the stirring vanes, the stirring vanes disclosed in JP-A-2003-342361 may be mentioned. The stirring vanes are particularly preferably large-scaled vanes, and the large-scaled vanes such as FULLZONE (registered trademark) vanes manufactured by Shinko Pantec Co., Ltd., or Maxblend (registered trademark) vanes manufactured by Sumitomo Heavy Industries, Ltd. may be mentioned. Further, paddle vanes, pitched paddle vanes, turbine vanes and propeller vanes may, for example, be used, and at that time, the diameter of the stirring vanes is in a range of from 20 to 95%, preferably from 30 to 90%, particularly preferably from 40 to 80% to the inner diameter of the container. The larger the diameter of the stirring vane becomes, the larger the shearing stress becomes, and therefore it is advantageous for contacting a viscous liquid (a crude polyether) and a solid powder (an inorganic adsorbent). Accordingly, the purification is preferably carried out in a large container provided with a stirrer having stirring vanes with a large diameter.

The temperature for heating and stirring the mixture containing the crude polyether, the inorganic adsorbent and optionally containing water, is usually from 20 to 200° C., preferably from 50 to 160° C., particularly preferably from 80 to 140° C., but is not limited thereto. The time of heating and stirring the above mixture is usually from 10 to 600 minutes, preferably from 30 to 240 minutes, particularly preferably from 60 to 180 minutes, but is not limited thereto.

Condition for Dehydration Under Reduced Pressure

In the case of employing the purification process of the present invention in which water is further added to the crude polyether and the inorganic adsorbent, a purified polyether is preferably obtained by heating and stirring the mixture, dehydrating it under reduced pressure, and further separating by filtration an inorganic adsorbent from a polyether. The dehydration under reduced pressure is carried out at a temperature of usually from 50 to 160° C., preferably from 80 to 140° C., more preferably from 90 to 120° C. under an absolute pressure of from 130 to 66,000 Pa, preferably from 400 to 13,000 Pat, more preferably from 600 to 6,600 Pa. The time required for dehydration under reduced pressure is usually from 0.5 to 6 hours, preferably from 1 to 3 hours. However, in the case of using water, the dehydration under reduced pressure from the mixture before the filtration step is not essential for the present invention, and a polyether obtained may be dehydrated after a step of separation by filtration of the inorganic adsorbent, and the dehydration of the polyether may not be conducted at all, if not necessary.

Filtration Conditions

The polyether containing the inorganic adsorbent is subjected to the above-mentioned treatment step, and then the inorganic adsorbent is separated from the polyether, whereby it is possible to obtain a purified polyether. The method for separating the inorganic adsorbent from the polyether is not particularly limited, but a filtration method is preferably employed since such a method is simplest. The filtration may be carried out under a gauge pressure of usually from 0.01 to 1 MPa, preferably from 0.05 to 0.5 MPa, by using a filter material to be used for the filtration, namely as a filter, e.g. a filter paper, a filter cloth or a metal mesh usually used industrially.

Other

In the process for purifying a polyether of the present invention, it is possible to add from 100 to a few thousands ppm of a stabilizer such as an antioxidant to be used for the case of producing a polyether, to the polyether. In the heating and stirring step and the filtration step in the process for purifying a polyether of the present invention, a stabilizer such as an antioxidant may be present in the polyether, whereby it is possible to suppress production of an aldehyde due to the oxidation reaction of the polyether. Further, in order to suppress such an oxidation reaction, it is preferred that inclusion of air into the polyether is prevented in the purification step, and such a purification step is carried out in an inert gas atmosphere.

Purified Polyether

In the present invention, the content of the total metal derived from the DMC catalyst contained in the polyether after purified is preferably at most 3 ppm, more preferably at most 1 ppm, particularly preferably at most 0.5 ppm. Such a low content of the metal can specifically be achieved by the process for purifying a polyether of the present invention, and further in the purification process of the present invention, it is possible to obtain a very high filtration rate at the time of removing an inorganic adsorbent by filtration from the polyether.

The hydroxyl equivalent of a polyether applicable in the purification process of the present invention, is usually, preferably from 5 to 160 mgKOH/g, more preferably from 8 to 112 mgKOH/g, most preferably from 16 to 90 mgKOH/g. The viscosity is usually from 50 to 15,000 mPa·s (25° C.), the total unsaturation degree is from 0.0003 to 0.050 meq/g, and the number of functional groups per molecule of the polyether is usually from 1 to 6. The hydroxyl value (mgKOH/g), the total unsaturation degree (meq/g) and the viscosity (mPa·s) of the polyether, are values measured in accordance with JIS-K-1557. The amount of the metal contained in the polyether is a value measured by using an atomic absorption photometer (AA-6200, manufactured by Shimadzu Corporation).

Application of Polyether

In the production of a polyurethane resin, the reaction to form a urethane bond from a polyol and a polyisocyanate compound is employed. In such a reaction, since an acidic compound and a basic compound containing a metal compound act as catalysts, the acidic and basic compounds containing the metal compound contained in the polyol, affect the urethane-forming reaction rate. In the production of a polyurethane resin, it is very often required to strictly control the urethane-forming reaction rate. Since the metal compound contained in the polyether also influences the reaction rate of an isocyanate group with a hydroxyl group, in order to strictly control the urethane-forming reaction rate, it is desired to produce a polyol containing a metal compound as low as possible and having a specific quality. In the case of the purified polyether obtainable by the purification process of the present invention, the content of a metal undesirable for controlling the urethane-forming reaction is very low, and therefore it is suitable as a polyether to be used for producing a polyurethane foam and a polyurethane elastomer. Further, the content of the metal impurities is low, and therefore it is also preferred as a base polyol for a surfactant, an operation oil or a lubricating oil.

EXAMPLES

Now, the present invention will be described in detail with reference to Examples and Comparative Examples, but the present invention is not limited thereto. Reference Examples 1 and 2 are production examples of DMC catalysts, and Reference Examples 3 to 6 are production examples of crude polyethers in which the DMC catalysts are used. Examples 1 to 46 which are purification examples of polyethers according to the present invention, were shown together with Comparative Examples 1 to 14.

With respect to various inorganic adsorbent powders used in Examples and Comparative Examples, among the inorganic adsorbent powders, when a total volume of particles having at most a specific particle size is 50% of the total volume of all the particles, such a specific particle size was shown as "50 vol % particle size ($\mu m$)" in Table 2. Further, as "vol % of particles having a particle size of at most 44 $\mu m$", the proportion of a total volume of the particles having a particle size of at most 44 $\mu m$ to the total volume of all the particles was shown in Table 2. For example, it is shown in Table 2 that, in the case of an adsorbent A (KW-700PEL), the total volume of particles having a particle size of at most 12.8 $\mu m$ occupies 50% of the total volume of the adsorbent A, and the total volume of particles having a particle size of at most 44 $\mu m$ in the adsorbent A occupies 92.4% in the total volume of the adsorbent A.

Reference Example 1

Production of tert-Butanol DMC Catalyst

An aqueous solution comprising 10.2 g of zinc chloride and 10 g of water, was put into a 500 mL flask. An aqueous solution comprising 4.2 g of potassium hexacyanocobaltate ($K_3Co(CN)_6$) and 75 g of water, was dropwise added to the aqueous zinc chloride solution in the above flask over a period of 30 minutes with stirring at a rate of 300 rpm (number of rotations/min). During this period, the mixed solution in the flask was maintained to be 40° C. After completion of the dropwise addition of the aqueous potassium hexacyanocobaltate solution, the mixture in the flask was further stirred for 30 minutes, whereupon a mixture comprising 80 g of tert-butanol (hereinafter referred to simply as TBA), 80 g of water and 0.6 g of polyol P (polyether triol having a hydroxyl value of 168 mgKOH/g obtained by addition of propylene oxide to glycerol), was added, followed by stirring at 40° C. for 30 minutes and further at 60° C. for 60 minutes. The obtained mixture was subjected to filtration under pressure (0.25 MPa) by means of a circular filter plate having a diameter of 125 mm and a filter paper for fine particles (No. 5C, manufactured by ADVANTEC) to separate a solid (a cake) containing the double metal cyanide complex.

Then, the obtained cake containing the double metal cyanide complex was transferred to a flask, and a mixture comprising 36 g of TBA and 84 g of water, was added, followed by stirring for 30 minutes, whereupon pressure filtration was carried out under the same condition as above, to obtain a cake. The cake obtained was transferred to a flask, and a mixture comprising 108 g of TBA and 12 g of water, was further added, followed by stirring for 30 minutes, to obtain a liquid (slurry) having the DMC catalyst dispersed in the TBA-water mixed solvent. To this slurry, 120 g of the above polyol P was added and mixed, and then the volatile component was distilled off at 80° C. for 3 hours and further at 115° C. for 3 hours to obtain a slurry-form DMC catalyst. The concentration of the solid catalyst component in the slurry was 3.9 mass %.

Reference Example 2

Production of Ethylene Glycol Dimethyl Ether DMC Catalyst

An aqueous solution comprising 10.2 g of zinc chloride and 10 g of water, was put into a 500 mL flask. An aqueous solution comprising 4.2 g of potassium hexacyanocobaltate ($K_3Co(CN)$ 6) and 75 g of water, was dropwise added to the aqueous zinc chloride solution in the flask over a period of 30 minutes with stirring at a rate of 300 rpm (number of rotations/min). During this period, the mixed solution in the flask was maintained to be 40° C. After completion of the dropwise addition of the aqueous potassium hexacyanocobaltate solution, the mixture in the flask was further stirred for 30 minutes, whereupon a mixture comprising 80 g of ethylene glycol dimethyl ether (hereinafter referred to as glyme) and 80 g of water, was added, followed by stirring at 40° C. for 30 minutes and at 60° C. for 60 minutes. The obtained mixture was subjected to filtration under pressure (0.25 MPa) by means of a circular filter plate having a diameter of 125 mm and a filter paper for fine particles (No. 5C, manufactured by ADVANTEC) to separate a solid (a cake) containing the double metal cyanide complex.

Then, the obtained cake containing the double metal cyanide complex was transferred to a flask, and a mixture comprising 36 g of glyme and 84 g of water, was added, followed by stirring for 30 minutes, whereupon pressure filtration was carried out under the same conditions as above, to obtain a cake. The obtained cake was transferred to a flask, and a mixture comprising 108 g of glyme and 12 g of water, was added, followed by stirring for 30 minutes. The obtain mixture was subjected to filtration under pressure (0.25 MPa) to separate a solid (a cake) containing the double metal cyanide complex. Under reduced pressure, the volatile component was distilled off at 80° C. for 5 hours to obtain a DMC catalyst in a solid-form.

Reference Example 3

Preparation 1 of Crude Polyether (Preparation of Crude Polyoxypropylene Diol (P1))

In the presence of the tert-butanol DMC catalyst prepared in Reference Example 1, propylene oxide was subjected to ring opening polymerization by using a bifunctional polyoxypropylene diol (molecular weight calculated by hydroxyl value: 700) as an initiator, whereby a crude polyoxypropylene diol (P1) having a hydroxyl value of 56.1 mgKOH/g (hydroxyl equivalent of 1,000) was obtained. In the crude polyoxypropylene diol (P1), 8.8 ppm of zinc (Zn) and 2.6 ppm of cobalt (Co), namely Zn and Co were contained in an amount of 11.4 ppm in total. Of the crude polyoxypropylene diol (P1), the viscosity was 330 mPa·s/25° C., and the total unsaturation degree was 0.004 meq/g.

Here, the molecular weight calculated by hydroxyl value is a molecular weight obtained in such a manner that a molecular weight per hydroxyl group is calculated from a measured value of the hydroxyl value (mgKOH/g), followed by multiplying it by the theoretical number of hydroxyl groups per molecule.

Reference Example 4

Preparation 2 of Crude Polyether (Preparation of Crude Polyoxypropylene Triol (P2)

In the presence of the tert-butanol DMC catalyst prepared in Reference Example 1, propylene oxide was subjected to ring opening polymerization by using a trifunctional polyoxypropylene triol (molecular weight calculated by hydroxyl value: 1,000) as an initiator, whereby a crude polyoxypropylene triol (P2) having a hydroxyl value of 16.8 mgKOH/g (hydroxyl equivalent: 3,330) was obtained. In the crude polyoxypropylene triol (P2), 7.6 ppm of zinc (Zn) and 2.6 ppm of cobalt (Co), namely 10.2 ppm of Zn and Co were contained in total. Of the crude polyoxypropylene triol (P2), the viscosity was 3,000 MPa·s/25° C., and the total unsaturation degree was 0.005 meq/g.

Reference Example 5

Preparation 3 of Crude Polyether (Preparation of Crude Polyoxypropylene Diol (P3)

In the presence of the glyme DMC catalyst prepared in Reference Example 2, propylene oxide was subjected to ring opening polymerization by using a bifunctional polyoxypropylene diol (molecular weight calculated by hydroxyl value: 1,000) as an initiator, whereby a crude polyoxypropylene diol (P3) having a hydroxyl value of 11.2 mgKOH/g (hydroxyl equivalent: 5,000) was obtained. In the crude polyoxypropylene diol (P3), 21.9 ppm of zinc (Zn) and 12.0 ppm of cobalt (Co), namely Zn and Co were contained in an amount of 33.9 ppm in total. Of the crude polyoxypropylene diol (P3), the viscosity was 4,200 MPa·s/25° C., and the total unsaturation degree was 0.035 meq/g.

Reference Example 6

Preparation 4 of Crude Polyether (Preparation of Crude Polyoxypropylene Diol (P4)

In the presence of the tert-butanol DMC catalyst prepared in Reference Example 1, propylene oxide was subjected to ring opening polymerization by using a bifunctional polyoxypropylene diol (molecular weight calculated by hydroxyl value: 1,000) as an initiator, whereby a crude polyoxypropylene diol (P4) having a hydroxyl value of 11.4 mgKOH/g (hydroxyl equivalent: 5,000) was obtained. In the crude polyoxypropylene diol (P4), 8.0 ppm of zinc (Zn) and 2.3 ppm of cobalt (Co), namely Zn and Co were contained in an amount of 10.3 ppm in total. Of the crude polyoxypropylene diol (P4), the viscosity was 4,090 MPa·s/25° C., and the total unsaturation degree was 0.006 meq/g.

Examples 1 to 26

Preparation of Crude Polyoxypropylene (P1)

Into a 100 L reactor provided with a stirring device having paddle vanes (the diameter of the paddle vanes is 50% of the inner diameter of the reactor), 40,000 g of the crude polyoxypropylene diol (P1) in Reference Example 3 was charged, and the internal temperature was maintained at 90° C. under nitrogen atmosphere. An inorganic adsorbent, water if the water was added (in the case of adding the water thereto, the water was charged together with the inorganic adsorbent), and as a filter aid, 400 g of ROKA-HELP as diatomaceous earth, manufactured by Mitsui Mining and Sealing Co., Ltd. were charged to the reactor, followed by heating and stirring at 90° C. for 60 minutes. In a case where the inorganic adsorbent was charged into the reactor dividedly in twice (in a case where the adsorbent is disclosed at two sites in the columns of the inorganic adsorbent in Table 3), after charging the initial inorganic adsorbent (the column of the inorganic adsorbent in the left side in Table 3), heating and stirring was carried out at 90° C. for 30 minutes, and further the rest of the inorganic adsorbent (the column of the inorganic adsorbent in the light side in Table 3) and 400 g of ROKA-HELP were charged thereto, followed by heating and stirring for 30 minutes. In a case where the inorganic adsorbent was added separately in twice, if water was added thereto, water was charged to the reactor all at once together with the initial inorganic adsorbent.

All of the additives such as the inorganic adsorbent were added thereto, and then stirring was carried out at a rotational speed of from 190 to 200 rpm (stirring power>12 kW/m$^3$). Thereafter, dehydration under reduced pressure was carried out for 60 minutes under the pressure of from 4,000 to 700 Pa, and then polyoxypropylene diol (P1') containing the inorganic adsorbent and ROKA-HELP was subjected to pressure filtration. The purified polyoxypropylene diol (P1') obtained was subjected to an evaluation of a filtration rate and an analysis of a metal content. The amount (%) of the inorganic adsorbent used and the amount (%) of water to be used (either of them are represented as mass % to the crude polyoxypropylene diol (P1)), the filtration rate, and the results of the analysis of the metal content of the polyoxypropylene diol (P1') are shown in Table 3. In Table 3, the measurement of the filtration rate was conducted in such a manner that filtration was carried out under pressure (0.3 MPa) by means of a circular filter plate having a diameter of 125 mm and a filter paper for fine particles (No. 5C, manufactured by ADVANTEC), and from the mass of the purified polyoxypropylene diol (P1') filtrated upon expiration of 30 minutes from the initiation of the filtration, the filtration rate (an obtained purified polyether (kg/filtration area (m$^2$) time (hour)) was calculated.

As shown in Table 3, Examples 1 to 26 were carried out by changing the types of the inorganic adsorbent from A to E, the amount of the inorganic adsorbent to be used and the amount of water to be added, and the results thereby obtained are shown in Table 3.

Example 27

The purified polyoxypropylene diol (P1') was obtained in the same manner as in Example 1 except that, after the inorganic adsorbent, water and ROKA-HELP were added to the crude polyoxypropylene diol (P1), the heating time at 90° C. was changed from 60 minutes to 30 minutes. The metal content and the filtration rate of the purified polyoxypropylene diol (P1') are shown in is Table 3.

Examples 28 to 34

A purified polyoxypropylene triol (P2') was obtained in the same manner as in Example 1 except that a crude polyoxypropylene triol (P2) was used, and the types and the amounts of the inorganic adsorbent disclosed in Table 4 and the amounts of water disclosed in Table 4 were changed. The metal content and the filtration rate of a purified polyoxypropylene triol (B) are shown in Table 4.

Examples 35 to 40

A purified polyoxypropylene diol (P3') was obtained in the same manner as in Example 1 except that a crude polyoxypropylene diol (P3) was used, and the types and the amounts of the inorganic adsorbent disclosed in Table 5 and the amounts of water disclosed in Table 5 were used. The metal content and the filtration rate of a purified polyoxypropylene diol (P3') are shown in Table 5.

Examples 41 to 46

A purified polyoxypropylene diol (P4') was obtained in the same manner as in Example 1 except that a crude polyoxypropylene diol (P4) was used, and the types and the amounts of the inorganic adsorbent disclosed in Table 6 and the amounts of water disclosed in Table 6 were used. The metal content and the filtration rate of a purified polyoxypropylene diol (P4') are shown in Table 6.

Comparative Examples 1 to 10

The purified polyoxypropylene diol (P1') was obtained in the same manner as in Example 1 except that the crude polyoxypropylene diol (P1) was used, and the type and the amount of an inorganic adsorbent as shown in Table 3 were used. The metal content and the filtration rate of the purified polyoxypropylene diol (P1') are shown in Table 2.

Comparative Examples 11 and 12

The purified polyoxypropylene triol (P2') was obtained in the same manner as in Example 1 except that the crude polyoxypropylene triol (P2) was used, and the type and the amount of an inorganic adsorbent as shown in Table 4 and the amount of water as shown in Table 4 were used. The metal content and the filtration rate of the purified polyoxypropylene triol (P2') are shown in Table 4.

Comparative Example 13

The purified polyoxypropylene diol (P3') was obtained in the same manner as in Example 1 except that the crude polyoxypropylene diol (P3) was used, and the type and the amount of an inorganic adsorbent as shown in Table 5 and the amount of water as shown in Table 5 were used. The metal content and the filtration rate of the purified polyoxypropylene diol (P3') are shown in Table 5.

Comparative Example 14

The purified polyoxypropylene diol (P4') was obtained in the same manner as in Example 1 except that the crude polyoxypropylene diol (P4) was used, and the type and the amount of an inorganic adsorbent as shown in Table 6 and the amount of water as shown in Table 5 were used. The metal content and the filtration rate of the purified polyoxypropylene diol (P4') are shown in Table 6.

The particle size distribution of the inorganic adsorbent used in Examples and Comparative Examples of the present invention was shown in Table 2.

TABLE 1

PREPARATION OF CRUDE POLYETHER POLYOL

| | Reference example (No. of crude polyether polyol) | | | |
|---|---|---|---|---|
| | 3 (P1) | 4 (P2) | 5 (P3) | 6 (P4) |
| Organic ligand of DMC catalyst | TBA | TBA | Glyme | TBA |
| Number of functional groups in initiator | 2 | 3 | 2 | 2 |
| Molecular weight of initiator | 700 | 1,000 | 1,000 | 1,000 |
| Hydroxyl value of crude polyether polyol (mgKOH/g) | 56.1 | 16.8 | 11.2 | 11.4 |
| Zn content (ppm) | 8.8 | 7.6 | 21.9 | 8.0 |
| Co content (ppm) | 2.6 | 2.6 | 12.0 | 2.3 |
| Total content of Zn and Co (ppm) | 11.4 | 10.2 | 33.9 | 10.3 |
| Viscosity of crude polyether polyol (MPa·s/25° C.) | 330 | 3,000 | 4,200 | 4,090 |
| Total unsaturation degree of crude polyether polyol (meq/g) | 0.004 | 0.005 | 0.035 | 0.006 |

TABLE 2

| Inorganic adsorbent | Manufacture of adsorbent | Grade | Compound name | 50 vol % particle size* (μm) | Vol % of particles having a particle size of at most 44 μm** |
|---|---|---|---|---|---|
| A | Kyowa Chemical Industry Co., Ltd. | KW-700PEL | Synthetic aluminum silicate | 12.8 | 92.4 |
| B | Kyowa Chemical Industry Co., Ltd. | KW-500PL | Synthetic hydrotalcite | 18.2 | 90.7 |
| C | Kyowa Chemical Industry Co., Ltd. | KW-2100 | Synthetic alumina/magnesia | 5.28 | 100 |
| D | Kyowa Chemical Industry Co., Ltd. | KW-600 | Synthetic magnesium silicate | 13.1 | 95.0 |
| E | Kyowa Chemical Industry Co., Ltd. | KW-700PL | Synthetic aluminum silicate | 25.4 | 98.3 |
| F | Kyowa Chemical Industry Co., Ltd. | KW-500SN | Synthetic hydrotalcite | 253 | 17.1 |
| G | Kyowa Chemical Industry Co., Ltd. | KW-700SL | Synthetic aluminum silicate | 61.5 | 37.4 |

TABLE 2-continued

| Inorganic adsorbent | Manufacture of adsorbent | Grade | Compound name | 50 vol % particle size* (μm) | Vol % of particles having a particle size of at most 44 μm** |
|---|---|---|---|---|---|
| H | Kyowa Chemical Industry Co., Ltd. | KW-600BUPS | Synthetic magnesium silicate | 43.3 | 50.9 |
| I | Kyowa Chemical Industry Co., Ltd. | KW-1000 | Synthetic hydrotalcite | 54.3 | 37.4 |
| J | Kyowa Chemical Industry Co., Ltd. | KW-2000 | Synthetic alumina/magnesia | 56.8 | 35.4 |
| K | Tomita Pharmaceutical Co., Ltd. | AD-500 | Synthetic hydrotalcite | 29.5 | 65.9 |
| L | Tomita Pharmaceutical Co., Ltd. | AD-600NS | Synthetic magnesium silicate | 164 | 2.3 |
| M | Mizusawa Industrial Chemicals, Ltd. | Mizukalife P-1G | Synthetic magnesium silicate | 221 | 4.6 |
| N | Kyowa Chemical Industry Co., Ltd. | KW-600S | Synthetic magnesium silicate | 22.5 | 86.7 |

*Particle size at the time when a total volume of particles having at most a specific particle size is 50% of the total volume of all the particles
**Vol % of particles having a particle size of at most 44 μm to all the particles

TABLE 3

| | Inorganic adsorbent (mass %) | Inorganic adsorbent (mass %) | Total of inorganic adsorbents (mass %) | Content of water added (mass %) | Metal content Zn + Co (ppm) | Filtration rate (kg/m²·hr) |
|---|---|---|---|---|---|---|
| Ex. 1 | A 0.05 | — | 0.05 | 0 | 4.9 | 540 |
| Ex. 2 | A 0.10 | — | 0.10 | 0 | 2.4 | 29 |
| Ex. 3 | A 0.20 | — | 0.20 | 0 | 0.9 | 27 |
| Ex. 4 | A 0.20 | — | 0.20 | 1 | 0.9 | 32 |
| Ex. 5 | A 0.20 | — | 0.20 | 3 | 1.5 | 46 |
| Ex. 6 | A 0.10 | A 0.10 | 0.20 | 0 | 0.7 | 14 |
| Ex. 7 | B 0.10 | — | 0.10 | 0 | 2.7 | 30 |
| Ex. 8 | B 0.10 | B 0.10 | 0.20 | 0 | 2.3 | 34 |
| Ex. 9 | C 0.10 | — | 0.10 | 0 | 2.0 | 40 |
| Ex. 10 | C 0.10 | — | 0.10 | 3 | 1.3 | 260 |
| Ex. 11 | C 0.10 | C 0.10 | 0.20 | 0 | 2.3 | 46 |
| Ex. 12 | C 0.20 | — | 0.20 | 1 | 1.5 | 154 |
| Ex. 13 | D 0.10 | — | 0.10 | 0 | 2.9 | 10 |
| Ex. 14 | E 0.10 | — | 0.10 | 0 | 2.8 | 12 |
| Ex. 15 | B 0.10 | C 0.10 | 0.20 | 0 | 1.7 | 41 |
| Ex. 16 | A 0.05 | C 0.20 | 0.25 | 0 | <0.1 | 70 |
| Ex. 17 | A 0.05 | C 0.20 | 0.25 | 0.5 | <0.1 | 100 |
| Ex. 18 | A 0.05 | C 0.20 | 0.25 | 1 | <0.1 | 117 |
| Ex. 19 | A 0.05 | C 0.20 | 0.25 | 3 | <0.1 | 650 |
| Ex. 20 | A 0.02 | C 0.08 | 0.10 | 3 | 2.1 | 390 |
| Ex. 21 | A 0.05 | C 0.20 | 0.25 | 5 | <0.2 | 960 |
| Ex. 22 | A 0.05 | C 0.50 | 0.55 | 1 | <0.1 | 220 |
| Ex. 23 | A 0.01 | C 0.04 | 0.05 | 3 | 2.8 | 60 |
| Ex. 24 | A 0.04 | C 0.15 | 0.19 | 0.5 | <0.3 | 57 |
| Ex. 25 | D 0.05 | C 0.20 | 0.25 | 3 | <0.2 | 105 |
| Ex. 26 | E 0.05 | C 0.20 | 0.25 | 3 | 0.4 | 156 |
| Ex. 27 | A 0.20 | — | 0.20 | 3 | 2.9 | 45 |
| Comp. Ex. 1 | — | — | — | 0 | 9.9 | 990 |
| Comp. Ex. 2 | F 0.10 | — | 0.10 | 0 | 8.4 | 34 |
| Comp. Ex. 3 | G 0.10 | — | 0.10 | 0 | 8.0 | 43 |
| Comp. Ex. 4 | H 0.10 | — | 0.10 | 0 | 9.8 | 26 |
| Comp. Ex. 5 | I 0.10 | — | 0.10 | 0 | 8.4 | 37 |
| Comp. Ex. 6 | J 0.30 | — | 0.30 | 0 | 7.6 | 140 |
| Comp. Ex. 7 | K 0.10 | — | 0.10 | 0 | 5.5 | 290 |
| Comp. Ex. 8 | L 0.10 | — | 0.10 | 0 | 7.7 | 65 |

TABLE 3-continued

|  | Inorganic adsorbent (mass %) | Inorganic adsorbent (mass %) | Total of inorganic adsorbents (mass %) | Content of water added (mass %) | Metal content Zn + Co (ppm) | Filtration rate (kg/m² · hr) |
|---|---|---|---|---|---|---|
| Comp. Ex. 9 | M 0.10 | — | 0.10 | 0 | 9.8 | 40 |
| Comp. Ex. 10 | N 0.10 | — | 0.10 | 0 | 4.1 | 60 |

TABLE 4

|  | Inorganic adsorbent (mass %) | Inorganic adsorbent (mass %) | Total of inorganic adsorbents (mass %) | Content of water added (mass %) | Metal content (ppm) | Filtration rate (kg/m² · hr) |
|---|---|---|---|---|---|---|
| Ex. 28 | A 0.10 | C 0.40 | 0.50 | 3 | 0.6 | 60 |
| Ex. 29 | A 0.40 | C 0.50 | 0.90 | 3 | <0.2 | 75 |
| Ex. 30 | A 0.08 | C 0.30 | 0.38 | 3 | 1.1 | 45 |
| Ex. 31 | A 0.15 | C 0.20 | 0.30 | 3 | 2.9 | 66 |
| Ex. 32 | A 0.40 | C 0.50 | 0.90 | 0 | 0.6 | 30 |
| Ex. 33 | A 0.05 | C 0.20 | 0.25 | 3 | 3.6 | 70 |
| Ex. 34 | A 0.05 | C 0.15 | 0.20 | 3 | 5.5 | 85 |
| Comp. Ex. 11 | F 0.90 | — | 0.90 | 3 | 9.1 | 53 |
| Comp. Ex. 12 | G 0.90 | — | 0.90 | 3 | 8.0 | 64 |

TABLE 5

|  | Inorganic adsorbent (mass %) | Inorganic adsorbent (mass %) | Total of inorganic adsorbents (mass %) | Content of water added (mass %) | Metal content (ppm) | Filtration rate (kg/m² · hr) |
|---|---|---|---|---|---|---|
| Ex. 35 | A 0.05 | C 0.20 | 0.25 | 3 | 17.9 | 18 |
| Ex. 36 | A 0.30 | C 0.57 | 0.87 | 3 | 5.2 | 30 |
| Ex. 37 | A 0.50 | C 2.0 | 2.5 | 3 | 0.7 | 24 |
| Ex. 38 | A 0.30 | C 1.2 | 1.5 | 3 | 1.6 | 30 |
| Ex. 39 | A 0.30 | C 1.2 | 1.5 | 5 | 2.1 | 39 |
| Ex. 40 | A 0.30 | C 1.2 | 1.5 | 1 | 1.4 | 11 |
| Comp. Ex. 13 | F 2.5 | — | 2.5 | 3 | 18.9 | 25 |

TABLE 6

|  | Inorganic adsorbent (mass %) | Inorganic adsorbent (mass %) | Total of inorganic adsorbents (mass %) | Content of water added (mass %) | Metal content (ppm) | Filtration rate (kg/m² · hr) |
|---|---|---|---|---|---|---|
| Ex. 41 | A 0.10 | C 0.15 | 0.25 | 3 | 5.8 | 28 |
| Ex. 42 | A 0.10 | C 0.20 | 0.30 | 3 | 4.3 | 39 |
| Ex. 43 | A 0.10 | C 0.35 | 0.45 | 3 | 2.9 | 29 |
| Ex. 44 | A 0.30 | C 0.60 | 0.90 | 3 | 0.9 | 36 |
| Ex. 45 | A 0.50 | C 1.10 | 1.60 | 3 | <0.3 | 41 |
| Ex. 46 | A 0.30 | C 0.60 | 0.90 | 0 | 0.9 | 8 |
| Comp. Ex. 14 | F 1.6 | — | 1.60 | 3 | 9.0 | 45 |

From Table 3 (showing test results of purification of a polyol having a hydroxyl equivalent of less than 1,100), it is found that, in the case inorganic adsorbents A, B, C, D and E (see each of Examples 2, 7, 9, 13 and 14) containing at least 50 vol % of fine particles having a particle size of at most 26 μm and further containing at least 90 vol % of fine particles having a particle size of at most 44 μm, the amount of a metal remained in a purified polyol obtained is very low as compared with adsorbents F, G, H, I, J, K, L and M (see each of Comparative Examples 2, 3, 4, 5, 6, 7, 8 and 9) not satisfying the above conditions of the particle size.

Further, from the results shown in Table 3, it is found that the combinations (see Examples 16 to 19, 21 to 22 and 24 to 26) of inorganic adsorbents A and C (synthetic aluminum silicate and synthetic alumina/magnesia), inorganic adsorbents E and C (synthetic aluminum silicate and synthetic alumina/magnesia), and inorganic adsorbents D and C (synthetic magnesium silicate and synthetic alumina/magnesia) contain further lower remaining amount of a metal, as compared with other combinations (see Examples 6, 8, 11 and 15, respectively) such as inorganic adsorbents A and A, inorganic adsorbents B (hydrotalcite) and B, inorganic adsorbents C and C, and inorganic adsorbents B and C. Especially, the combination of inorganic adsorbents A and C has extremely good filtration property (Example 19).

In the case of Comparative Example 13 in which the inorganic adsorbent D (KW-600: synthetic magnesium silicate, BET surface area as a catalog value: 165 m²/g) is used, and Comparative Example 4 in which inorganic adsorbent H (KW-600BUPS: synthetic magnesium silicate, BET surface area as a catalog value: 571 m²/g), their compositions as an inorganic compound are a synthetic magnesium silicate and thus are the same, and the amount of the inorganic adsorbent and the amount of water to be used are also the same, but a metal content of 2.9 ppm in the purified polyether obtained by using the inorganic adsorbent D becomes the value of at most ⅓ of a metal content of 9.8 ppm in the purified polyether obtained by using the inorganic adsorbent H. In spite that the surface area of the inorganic adsorbent H is four times larger than the inorganic adsorbent D, the inorganic adsorbent H cannot bring a preferred metal removal results as compared with the case of using the inorganic adsorbent D when they are used in the same amount in the purification process of the present invention. Namely, it is found that in the purification process of the present invention, such a preferred metal removal results are not always obtainable by increasing the total surface area of an inorganic adsorbent by using inorganic adsorbent particles having a small average particle size.

It is commonly considered that the adsorption performance is increased by increasing the total surface area of an inorganic adsorbent, and the metal adsorption performance in a polyether is thereby increased, but the above results are against such expectation. Namely, it is clear that the effect of the purification process of the present invention is not an effect obtainable by simply increasing the total surface area by using an inorganic adsorbent having a small particle size, and such an effect of the present invention can not be anticipated from the technical common knowledge.

It is found that from the results shown in Tables 4 and 6 (Test Examples of purification of polyols respectively having a hydroxyl equivalent of from 1,100 to 3,500 and that of more than 3,500, respectively), the combination of the inorganic adsorbent A (synthetic aluminum silicate) and C (synthetic alumina/magnesia) shows a vastly superior metal removal effect to the cases (Comparative Examples 11, 12 and 13) in which the adsorbents F (hydrotalcite) and G (synthetic aluminum silicate) are used. Further, also from the results shown in Table 5 (Examples in which the amount of a DMC catalyst used is large and the amount of a catalyst remaining in a crude polyether is large), it is found that the combination of the inorganic adsorbents A and C shows a superior removal effect of a metal derived from DMC, to the adsorbent F (Comparative Example 12).

INDUSTRIAL APPLICABILITY

In the purified polyether obtainable by means of the purification process of the present invention, the content of a metal, which is undesirable for the control of urethane-forming reaction, is very small, and therefore such a polyether is suitable as a polyether to be used for production of a polyurethane foam and a polyurethane elastomer. Further, the content of metal impurities is small, and therefore such a polyether is suitably applicable in the use as a base polyol for a surfactant, an operation oil or a fabricating oil.

The entire disclosure of Japanese Patent Application No. 2006-236937 filed on Aug. 31, 2006 including specification, claims and summary is incorporated herein by reference in its entirety.

What is claimed is:

1. A process for purifying a crude polyether obtained by ring opening polymerization of an alkylene oxide or a cyclic compound containing an alkylene oxide with an initiator having at least one hydroxyl group, in the presence of a double metal cyanide complex catalyst, said process comprising adding, directly following the ring opening polymerization, a powder of an inorganic adsorbent containing at least 50 vol % of fine particles having a particle size of at most 26 µm and further containing at least 90 vol % of fine particles having a particle size of at most 44 µm, to the crude polyether to let a metal derived from the above double metal cyanide complex catalyst remained in the polyether phase be adsorbed on the above powder; and further separating the above powder from the above polyether.

2. The process for purifying a polyether according to claim 1, wherein the inorganic adsorbent is selected from the group consisting of synthetic aluminum silicate, synthetic alumina/magnesia, synthetic hydrotalcite, synthetic magnesium silicate and a combination thereof.

3. The process for purifying a polyether according to claim 2, wherein the inorganic adsorbent is a combination of synthetic aluminum silicate and synthetic alumina/magnesia.

4. The process for purifying a polyether according to claim 1, wherein the powder of an inorganic adsorbent contains at least 50 vol % of fine particles having a particle size of at most 20 µm and further containing at least 90 vol % of fine particles having a particle size of at most 44 µm.

5. The process for purifying a polyether according to claim 1, wherein before, during and/or after adding the powder of an inorganic adsorbent to the polyether, water is added to the above polyether to let the above powder and the water coexist in the polyether, and further with or without dehydration, the powder is separated and removed from the polyether.

6. The process for purifying a polyether according to claim 1, wherein the powder is separated from the above polyether by using a filter aid.

7. The process for purifying a polyether according to claim 1, wherein the powder of an inorganic adsorbent is added to the crude polyether, followed by heating at a temperature of from 50 to 160° C. and stirring at a stirring power of at least 8 kW/m³ to let the metal derived from a double metal cyanide complex catalyst be adsorbed on the powder.

8. A process for producing a polyether, which comprises (1) ring opening polymerization of an alkylene oxide or a cyclic compound containing an alkylene oxide with an initiator having at least one hydroxyl group, in the presence of a double metal cyanide complex catalyst containing tert-butanol as at least a part of a ligand, to synthesize a polyether, and (2) purifying the polyether by the process as defined in claim 1.

9. A process for purifying a crude polyether obtained by ring opening polymerization of an alkylene oxide or a cyclic compound containing an alkylene oxide with an initiator having at least one hydroxyl group, in the presence of a double metal cyanide complex catalyst, said process comprising adding, directly following the ring opening polymerization, a powder of an inorganic adsorbent containing at least 50 vol % of fine particles having a particle size of at most 26 µm and at least 90 vol % of fine particles having a particle size of at most 44 µm, to the above polyether to let a metal derived from the above double metal cyanide complex catalyst remained in the polyether phase be adsorbed on the powder; said inorganic adsorbent being selected from the group consisting of a synthetic aluminum silicate, a synthetic alumina/magnesia, a synthetic hydrotalcite, and a combination thereof; and further separating the powder from the polyether.

10. The process for purifying a crude polyether according to claim 9, wherein the inorganic adsorbent is a combination of synthetic aluminum silicate and synthetic alumina/magnesia.

11. The process for purifying a crude polyether according to claim 9, wherein the powder of an inorganic adsorbent contains at least 50 vol % of fine particles having a particle size of at most 20 μm and further containing at least 90 vol % of fine particles having a particle size of at most 44 μm.

12. The process for purifying a crude polyether according to claim 10, wherein the powder of an inorganic adsorbent contains at least 50 vol % of fine particles having a particle size of at most 20 μm and further containing at least 90 vol % of fine particles having a particle size of at most 44 μm.

* * * * *